United States Patent [19]

Smith et al.

[11] 4,449,219
[45] May 15, 1984

[54] FREE ELECTRON LASER

[76] Inventors: Todd I. Smith, 2260 St. Francis Dr., Palo Alto, Calif. 94303; Luis R. Elias, 1560 Ashcroft Way, Sunnyvale, Calif. 94087; John M. J. Madey, 2120 Amherst St., Palo Alto, Calif. 94306

[21] Appl. No.: 55,163

[22] Filed: Jul. 6, 1979

[51] Int. Cl.³ .............................................. H01S 3/09
[52] U.S. Cl. ...................................................... 372/2
[58] Field of Search .................. 337/94.5 P, 94.5 PE; 372/2

[56] References Cited

U.S. PATENT DOCUMENTS 3,822,410  7/1974  Madey .......................... 331/94.5 PE

OTHER PUBLICATIONS

J. Appl. Phys., vol. 50, No. 7, Jul. 1979, pp. 4580–4583, (Smith, Madey, Elias, and Deacon).
Phys. Rev. Lett. 38, 892–894, (1977).
Smith et al., Stanford University High Energy Physics Lab. Report #HEPL 830, Aug. 1978, "Reducing Sensitivity of a Free Electron Laser to Electron Energy".

Primary Examiner—William D. Larkins
Attorney, Agent, or Firm—Paul B. Fihe

[57] ABSTRACT

The invention involves a free electron laser having reduced sensitivity to variations in the energy of the input electrons. This effect is achieved by first laterally dispersing the electrons in accordance with their energies and thereafter injecting the dispersed electrons with angular and/or lateral variations to alternate polarity deflecting means.

11 Claims, 13 Drawing Figures

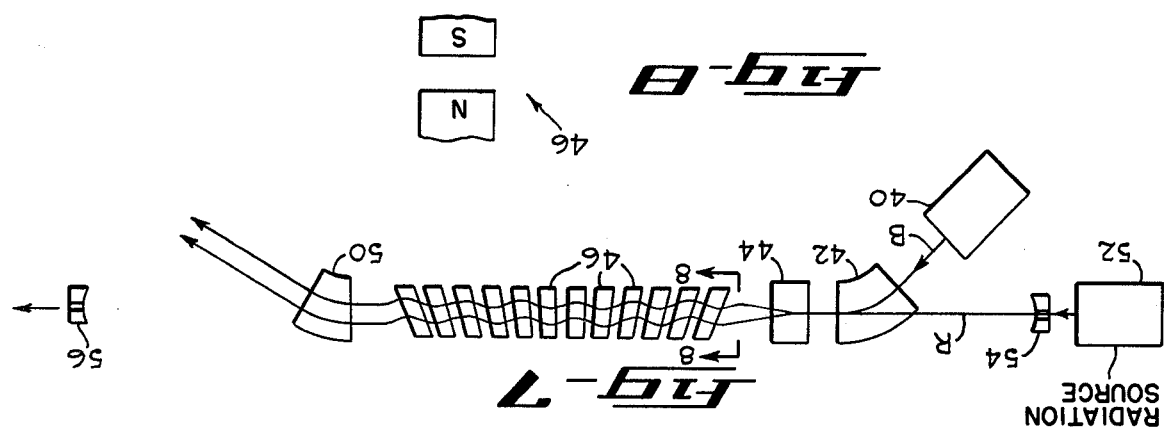
Fig-8
Fig-7
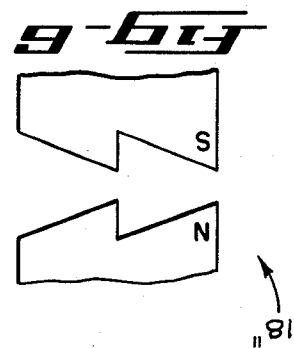
Fig-6
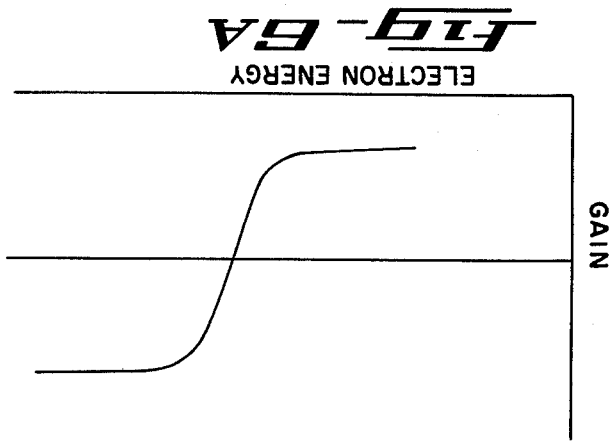
Fig-6A
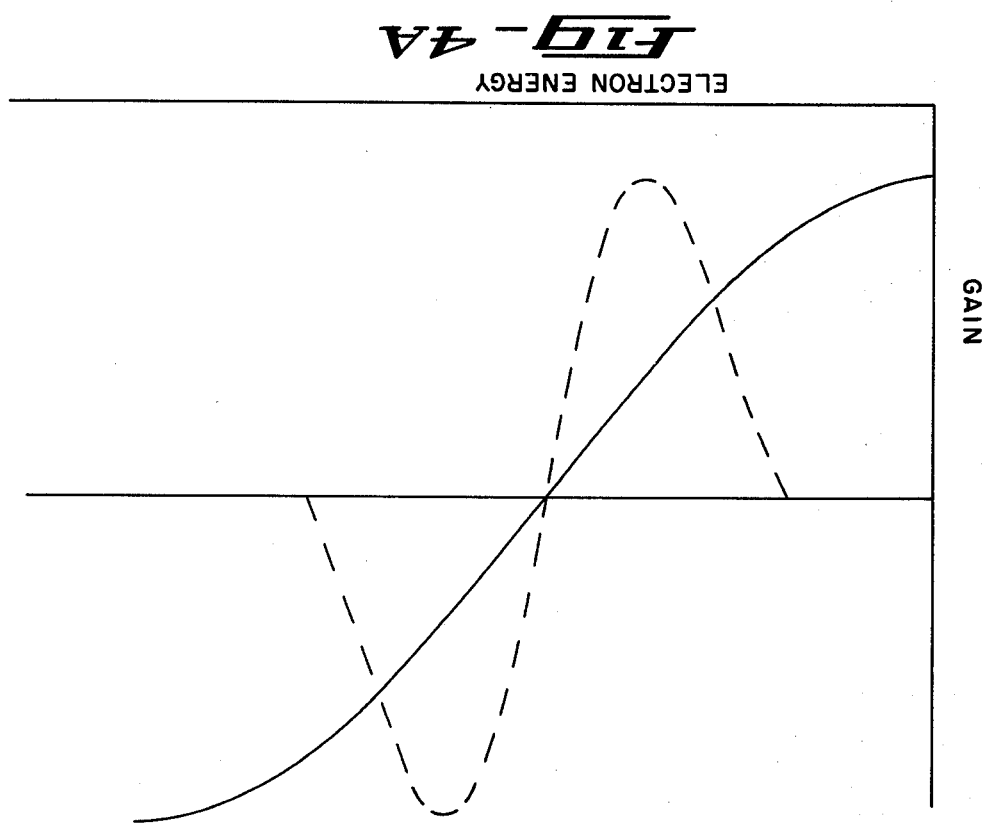
Fig-4A

FREE ELECTRON LASER

FIELD OF THE INVENTION

The present invention relates generally to lasers and more particularly to a free electron laser wherein a beam of relativistic electrons are periodically deflected transversely relative to their general longitudinal path to generate and/or amplify a beam of radiation such as visible light, x-rays, millimeter weaves, infrared radiation, or the like.

BACKGROUND OF THE INVENTION

The present invention utilizes the general principles enunciated in U.S. Pat. No. 3,822,410 issued July 2, 1974 to John Madey. Briefly, as explained in detail in that patent, the deflection of the electrons can be achieved either by magnetic or electrical means, for example by a linear array of magnets having opposite polarities, and upon each occurrence of deflection of the individual electron, radiation is emitted. The mechanism can be used to generate a beam of radiation so as to function as an oscillator, or alternatively can be applied to an existent beam, for example of coherent laser light, to effect amplification thereof. As pointed out specifically in that patent, the energy of the electron beam to carry out the process must be quite homogeneous if the operation is to be highly effective, and such a homogeneous electron beam with but a small energy spread is difficult to obtain without very sophisticated and expensive equipment.

SUMMARY OF THE PRESENT INVENTION

Accordingly, it is the general objective of the present invention to provide a free electron laser which incorporates means for reducing the sensitivity of the oscillator or amplifier process to an injected beam of electrons having a relatively wide energy spread, and thus to effect substantial improvement in obtainable gain and output power in a relatively simple and inexpensive fashion.

Basically, this objective is achieved generally by directing a relativistic beam of electrons along a predetermined axis or path which is provided with a sequence of magnets or other electron deflecting means for effecting deflection of the electrons periodically in one direction or the other so as to generate radiation, as explained in the previously mentioned United States patent. After their traverse of the linear magnetic array or other deflecting means, the electrons can either be merely discharged or "dumped" or can be recirculated through an electron accelerator which restores the initial electron energy that has been depleted in its transit of the magnetic array to generate the radiation.

Since the general effectiveness of this process, as described in the previous United States patent, is highly dependent upon the homogeneity of the energy of the individual electrons and since standard electron accelerating mechanisms do generate an electron beam wherein the individual electron energies or momentum can vary considerably and thus result in a substantial reduction in the gain obtainable in the generated beam of light or other radiation, the present invention provides for a reduced sensitivity to such electron energy or momentum variation, and ultimately a more effective process.

More particularly, prior to their entry along the axis of the linear array of magnets or other electron deflecting units, magnetic or other means are provided to disperse the electrons in accordance with their individual energy or momentum so that a lateral displacement is obtained. Such mechanisms have been utilized, for example, in many charged particle spectrographs, and are well known to those skilled in the art.

As a consequence, when the electrons enter the linear array of deflecting magnets they are displaced in a lateral or transverse direction, and in accordance with the present invention are subjected to the periodic deflecting means, which vary in accordance with the extent of transverse electron disposition, and thus the individual electron energy or momentum. This variation can be achieved in various ways, such as a transverse divergence in the pole faces of the magnets so that a variance in the transverse field strength is experienced, dependent upon the transverse or lateral disposition of the electron passing therethrough, or alternatively by making the periodicity of the magnets a function of transverse position, or by injecting the electrons angularly at one side of the optical axis of the magnetic array.

Consequently, as will be explained in detail hereinafter, the gain in the transference of energy between the relatively inhomogeneous electron beam and the generated beam of radiation, light, x-ray, or otherwise, can be maintained.

BRIEF DESCRIPTION OF THE DRAWINGS

The stated objective of the invention and the manner in which it is achieved, as summarized hereinabove, will be more readily understood from a perusal of the following description of several exemplary embodiments of the invention as shown in the accompanying drawings wherein:

FIG. 4 is a fragmentary transverse sectional view taken along line 4—4 of FIG. 3 illustrating in particular one form of magnetic pole configuration in the linear array of magnets, FIG. 4A includes a graphical representation of the gain characteristics of this particular structure, FIG. 6 is a view of yet another magnetic pole configuration incorporating the principles of the present invention, FIG. 6A is a graphical representation of the gain characteristics of the FIG. 6 structure, FIG. 7 is a diagrammatic view corresponding to FIG. 1 constituting a top plan view of a slightly modified embodiment of the invention which functions as an amplifier, FIG. 8 is a transverse fragmentary sectional view taken along line 8—8 of FIG. 7 illustrating the transverse disposition of the magnetic pole faces in this embodiment.

DETAILED DESCRIPTION OF THE EXEMPLARY EMBODIMENTS OF THE INVENTION

Figure 1:
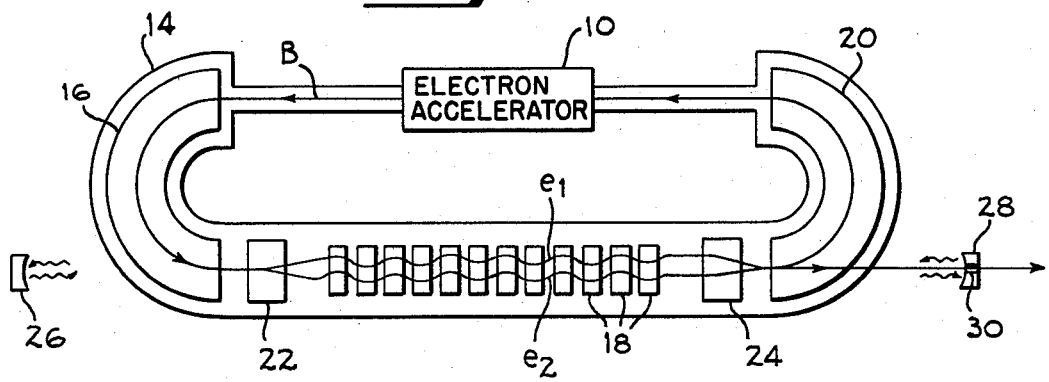
FIG. 1 is a diagrammatic top plan view of an electron recirculating system utilized to generate a laser beam in accordance with the present invention.

With initial reference to FIG. 1, a more or less conventional electron accelerator 10 is arranged to generate and deliver a beam B of relativistic electrons along a predetermined path within a standard vacuum envelope indicated at 14. After its original linear trajectory, the electrons are diverted by a bending magnet 16 through an angle of approximately 180° to thereafter traverse a linear array of deflecting magnets 18 wherein the radiation generation mechanism occurs and energy is withdrawn from the electrons. After their transit through the linear magnetic array, the electron beam at somewhat reduced energy is delivered to another bending magnet 20 which returns the electron beam to the accelerator 10 so that additional energy may be imparted thereto, thus to restore that lost during the radiation generation process. Thus, briefly, a recirculating electron system is provided generally in the fashion described in the previously mentioned United States patent.

In accordance with the present invention, immediately prior to the entry of the electron beam to the path or axis through the linear array of magnet 18, the electrons are exposed to an energy or momentum-dispersing magnet 22, or other mechanism of the type generally found in existing charged particle spectrographs so that details of this unit will not be described.

As a consequence of its dispersion characteristics, electrons of variant energies are dispersed, as best indicated in FIG. 4, so that an electron $e_1$ of higher energy will be deflected to the left and another electron $e_2$ of lower energy will be deflected to the right to follow through the magnetic array substantially parallel but laterally or transversely spaced paths. After the transit of the electrons through the linear array, they are once again exposed to a dispersing magnet 24 which reassembles the electrons of variant energy for subsequent transit through the bending magnet 20 and the electron accelerator 10 wherein the additional energy is imparted thereto as mentioned hereinabove.

Figure 2:
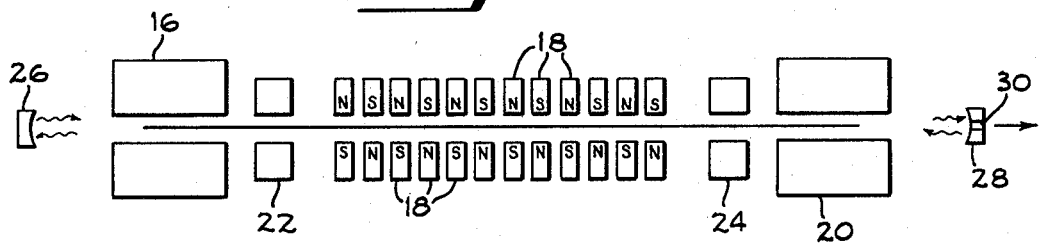
FIG. 2 is a diagrammatic side view of the FIG. 1 structure.

As explained in the previously mentioned patent, successive magnets 18 are arranged of opposite polarity, as shown in FIG. 2, so as to effect deflection of the beam and the generation of photons so as to generate a beam of radiation at various frequencies such as in the light, millimeter wave, infrared or x-ray spectrum, as desired. Resonator mirrors 26, 28 are disposed at the opposite ends of the axis, as most clearly shown in FIG. 2, and the generated light or other radiation can ultimately be withdrawn through a small opening 30 in one of the resonator mirrors, as indicated to the right in that figure. Other radiation outputs such as to one side of the mirrors will, of course, occur to those skilled in the art. The action, as described, obviously constitutes an oscillator arrangement, but it will be understood by those skilled in the art that light or other radiation can be injected from the left and amplified by the same basic process (e.g., as shown in FIG. 7).

Figure 3:
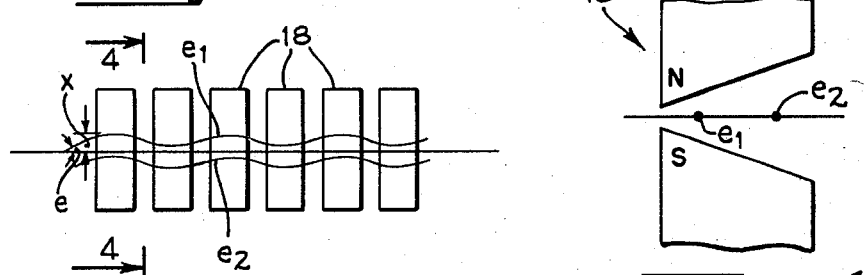
FIG. 3 is an enlarged view at the electron entry position of the FIG. 1 structure.

Given the described correlation between the individual electron energy or momentum and its position (X) or angle ($\theta$) (see FIG. 3) at the entrance end of the array of magnets, the magnets themselves can be designed in accordance with the present invention so that the gain achieved in the generation of the beam of radiation is far less sensitive to the electron energy spread. More particularly, as best illustrated in FIG. 4, the pole faces of each deflecting magnet are angularly tapered to provide a transverse or lateral divergence so that the field to which the higher energy electron $e_1$ is subjected is substantially greater than that to which a lower energy electron $e_2$ is exposed. As will be explained in detail hereinafter, the different field gradients to which the different electrons are subjected essentially widens the gain curve achievable and ultimately allows an accelerating mechanism of much lower quality, and thus less expensive, to be utilized in the invention.

With specific reference to FIG. 4A, the conventional gain curve with parallel pole faces relative to the input energy of the electrons is shown in dotted lines at $A_1$, and as can be readily visualized, is rather steep so that any substantial spread in input electron energy will substantially diminish the gain obtainable. On the other hand, with the divergent magnetic pole face arrangement establishing a transverse gradient, as shown in FIG. 4, a much wider gain curve, as shown in full lines at $A_2$ in FIG. 4A, can be obtained in conjunction with the divergent angles or positions of the electrons entering the magnetic array as a result of the action of the momentum or energy dispersing entry magnet 22.

By way of more detailed explanation of the action, in a free electron laser where a relativistic electron beam B traverses a periodic transverse magnetic field as described hereinabove, any light developed or sent through the field with the electron beam will be amplified if the electron energy is set equal to $\gamma_r mc^2$ where m is the mass of the particle, c is the velocity of light, and $$\gamma_r = \sqrt{\frac{\lambda_q}{2\lambda}} (1 + \alpha^2 B^2)^{\frac{1}{2}} \left(1 - \frac{\lambda_q}{2\lambda} \theta^2 \right)^{-\frac{1}{2}} \quad (1)$$

In this equation, $\lambda_q$ is the magnet period, $\lambda$ is the optical wavelength, B is the magnetic field amplitude, and $\theta$ is the angle between the propagation vector of the optical radiation and the average velocity of the electrons through the magnetic array. $\alpha^2$ is a constant which is determined by magnet geometry and the product $\alpha^2 B^2$ approximates unity for magnetic fields of a few kilogauss.

For magnets in which the field amplitude and period are held constant throughout the interaction length, the equation for gain has the form $$G(\gamma) = A \frac{r_0^2 B^2 P_e \lambda_q^4}{\gamma_r^2 mc^2} \frac{d}{d\gamma} \left[ \frac{\sin(2\pi N)\left(\frac{\gamma - \gamma_r}{\gamma_r}\right)}{(\gamma - \gamma_r)/\gamma_r} \right]^2 \quad (2)$$

where $r_0$ is the classical electron radius, $p_e$ is the electron density, N is the number of periods in the magnet, and A is a constant of magnitude $\approx 0.002$ if CGS units are used. It is to be particularly noted that the gain is basically determined by the difference between the input energy $\gamma$ and the resonance energy $\gamma_r$, or in other words $(\gamma - \nu_r)$. In the structure as shown in FIGS. 1, 2, 3, and 4, the desired gain and reduced sensitivity to input electron energy can be achieved first by controlling the resonance energy which can be made a function of the position (X), as indicated in FIG. 4, or by the angle ($\theta$)

at which the electrons are injected into the magnetic array, and thereafter the amplitude or period of the magnetic fields in the linear array and the direction of travel of the electrons therethrough. If the position and/or angle at which the beam B is injected into the magnetic array is made a function of the incident electron's energy in the manner explained hereinabove, the gain will be modified by the variation of the resonance energy with the energy of the incident electrons. Initially, if the momentum-dispersing magnet 22 is designed so that a change of energy $d\gamma$ of an electron will result in a displacement $dx = K_2 d\gamma$ at the entrance to the laser magnets, we have $$x = K_2(\gamma - \gamma^o), \quad (3)$$

depending upon the design of the momentum-dispersing magnet 22.

If the electron injection position is changed or displaced in the manner described by the momentum-dispersing magnet 22, the resonance energy $\gamma_r$ will change according to $d\gamma_r = K_1 dx$, and if we assume $K_1$ to be a constant, then $$\gamma_r(x) = \gamma_{ro} + K_1 x \quad (4)$$

where $\gamma_{ro}$ is defined as $\gamma_r$ when $x = 0$.

Combining equations (3) and (4), we have $$\gamma - \gamma_r(x) = (\gamma - \gamma^o)(1 - K_1 K_2) + (\gamma^o - \gamma_{ro}). \quad (5)$$

This equation indicates the reduced sensitivity of the free electron laser to electron input energy, and referring to equation (2) wherein it is indicated that the gain is a function of $\gamma - \gamma_r$, it will be seen that as the product $K_1 K_2$ approaches 1, the gain becomes completely independent of input energy.

As previously mentioned, the resonance energy $\gamma_r$ can be made to be a function of position by the introduction of some form of transverse field gradient, or by making the magnet period a function of transverse position.

If $\theta = 0$ in equation (1), then $$d\gamma_r/\gamma_r = \left[ \frac{a^2 B^2}{1 + a^2 B^2} \frac{dB/dx}{B} + \frac{1}{2} \frac{d\lambda_q/dx}{\lambda_q} \right] dx. \quad (6)$$

so that $$K_1 = \gamma_r \left[ \frac{a^2 B^2}{1 + a^2 B^2} \frac{dB/dx}{B} + \frac{1}{2} \frac{d\lambda_q/dx}{\lambda_q} \right]. \quad (7)$$

It is seen the $K_1$ can be affected by transverse magnetic field gradients $dB/dx$, by transverse period gradients $d\lambda_q/dx$, or by any combination of these gradients.

In the specifically described case with respect to FIGS. 1, 2, 3 and 4, the divergent angle of the pole faces can be readily arranged so that the product of $K_1 K_2 = 0.75$ which is that illustrated in the solid line graphical illustration $A_2$ in FIG. 4A, indicating quite clearly in a graphical form the reduced sensitivity of the gain to variations in the input electron energy.

Figure 5:
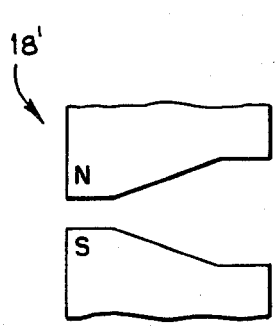
FIG. 5 is a view similar to FIG. 4 of a slightly modified magnetic pole configuration.
Figure 5A:
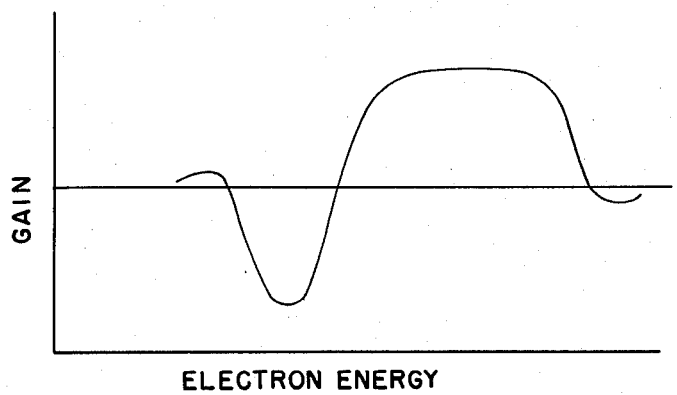
FIG. 5A is a graphical representation of the gain characteristics of the FIG. 5 magnetic configuration.

Quite obviously, other magnet configurations than that shown in FIG. 4 can be utilized with variant gain characteristics, and examples are shown in FIGS. 5 and 6 at 18' and 18" with attendant FIGS. 5A and 6A representing the gain characteristics thereof. Obviously, yet other generally divergent pole faces can obtain yet different gain characteristics desired for a particular installation.

The described structures all rely on the transverse field gradient $dB/dx$ but the desired effect can also be achieved by making the magnet period a function of transverse position $d\lambda_q/dx$. By way of example, reference is made to FIGS. 7 and 8 wherein, as shown in FIG. 8, the pole faces are parallel but the magnets themselves have an angular taper as shown in FIG. 7, to provide a variation in the periodicity of the magnets at transverse positions. More particularly, a relativistic electron beam is injected, as shown in FIG. 7, from an electron accelerator 40 to be deflected by a bending magnet 42 so as to follow an axial path through a momentum-dispersing magnet 44 such as described in the first embodiment of the invention, and thereafter to pass in laterally displaced positions dependent upon the individual electron energy through a linear array of magnets 46 which are tapered so that the magnets periods vary in the transverse direction. After the traverse of the linear magnetic array, the electrons are, through use of a bending magnet 50, diverted to a beam collector or "dump." From a radiation source indicated at 52, a generated beam of radiation developed along the axis of the magnetic array will emerge through an opening in one of two apertured resonators 54, 56, appropriately located beyond the extremities of the device, having been amplified during the transit.

While the invention can utilize a transverse field gradient after the initial dispersion of the electrons (FIGS. 1–6) or a change in magnetic periodicity (FIGS. 7 and 8), it will be apparent to those skilled in the art that yet another arrangements can be made incorporating the principles of the invention, relying generally on the variation in the interaction characteristics dependent on the angular and/or positional characteristics of the injected electrons.

Figure 9:
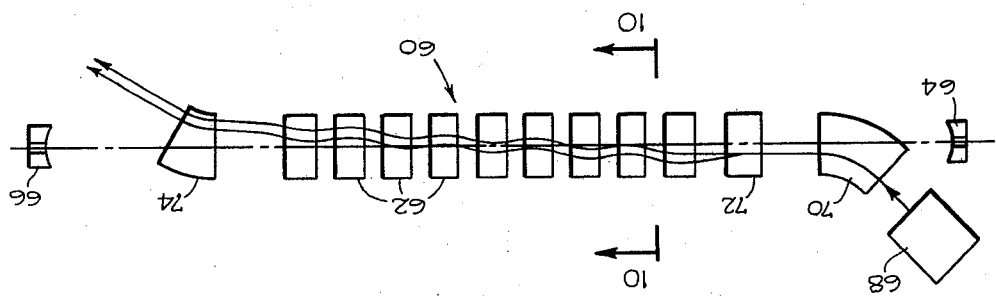
FIG. 9 is a diagrammatic view of yet a further embodiment of the invention.
Figure 10:
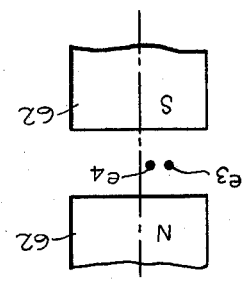
FIG. 10 is a transverse sectional view taken along line 10—10 of FIG. 9.

For example, in FIGS. 9 and 10, magnetic array 60 of identical magnets 62, having flat substantially parallel pole faces (see FIG. 10), define an optical axis extending between optically-aligned resonator mirrors 64, 66. Electrons are generated from a source 68 and deflected by a bending magnet 70 into a dispersing magnet 72 which disperses the input electrons between paths indicated at $e_3$ and $e_4$ all at one side of the optical axis through the magnetic array 60.

After traverse of the magnetic array 60, the electrons are deflected by a bending magnet 74, to be dumped or discharged in any suitable fashion, and the emergent radiation (optical or otherwise) is withdrawn for appropriate utilization.

Many other variations or alterations in the structures as described can be envisioned within the general scope of the invention, and the foregoing description of several embodiments accordingly is to be considered as purely exemplary, and not in a limiting sense, and the actual scope of the invention is to be indicated only by reference to the appended claims.

What is claimed is:

1. A free electron laser which comprises
   means for directing a relativistic electron beam along a predetermined path,
   means for dispersing electrons laterally and/or angularly in response to energy differences thereof, and
   means disposed along said path for periodically deflecting the dispersed electrons transversely relative to said path in alternating opposite directions, said deflecting means establishing fields which vary between paths of dispersed electrons.

2. A free electron laser according to claim 1 wherein said dispersing means constitutes magnetic means arranged to effect dispersion of the electrons of differing energies.

3. A free electron laser according to claim 1 wherein said deflecting means includes a plurality of aligned magnets with alternate magnets having opposite polarity and arranged to establish transverse gradients.

4. A free electron laser according to claim 3 wherein said magnets have pole faces which diverge transversely of the path of said electron beam.

5. A free electron laser according to claim 1 wherein said deflecting means includes a plurality of aligned magnets with alternate magnets having opposite polarity and said magnets being arranged with different periodicities at transverse positions.

6. A free electron laser according to claim 1 wherein said deflecting means includes a plurality of aligned like magnets with opposed parallel pole faces, and said electrons enter the magnets angularly relative to the optical axis defined by said deflecting magnets.

7. A free electron laser according to claim 1 which comprises
electron accelerator means for generating the electron beam.

8. A free electron laser according to claim 1 which comprises
means for recirculating the electrons after their traverse of said path through said deflecting means.

9. In combination with a free electron laser according to claim 1,
external means for generating a beam of radiation along said predetermined path to provide amplification thereof.

10. In a free electron laser utilizing an input beam of electrons dispersed
transversely in accordance with their individual energies,
means disposed along the electron beam path for periodically deflecting the electrons in opposite directions,
said deflecting means establishing fields which vary between paths of dispersed electrons.

11. A free electron laser according to claim 1 wherein the electron energy equals $\gamma_r mc^2$
where m is the mass of the particle,
c is the velocity of light, and $$\gamma_r = \sqrt{\frac{\lambda_q}{2\lambda}} \; (1 + \alpha^2 B^2)^{\frac{1}{2}} \left(1 - \frac{\lambda_q}{2\lambda} \theta^2 \right)^{-\frac{1}{2}}$$

wherein
$\lambda_q$ is the magnet period,
$\lambda$ is the optical wavelength,
B is the magnetic field amplitude,
$\theta$ is the angle between the propagation vector of the optical radiation and the average velocity of the electrons through the magnetic array,
$\alpha^2$ is a constant determined by magnet geometry, and
the product of $\alpha^2 B^2$ approximates unity for magnetic fields of a few kilogauss.

* * * * *